March 14, 1933.   W. N. BOOTH   1,901,077
VEHICLE WHEEL
Filed April 7, 1924   4 Sheets-Sheet 1
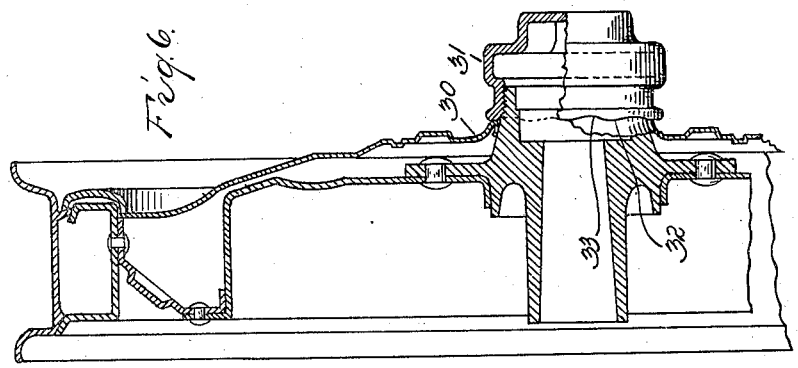
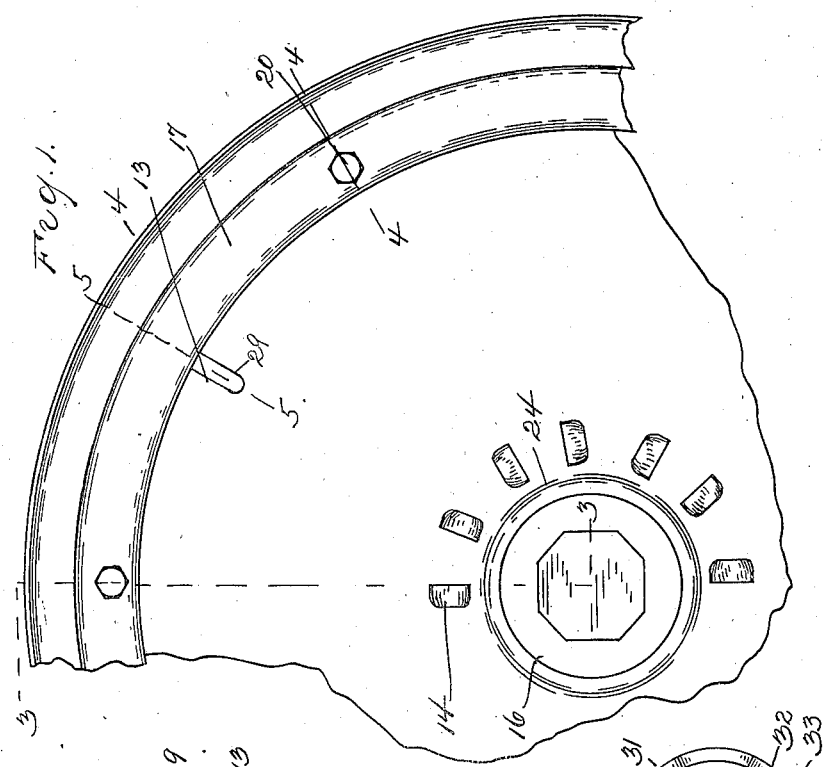
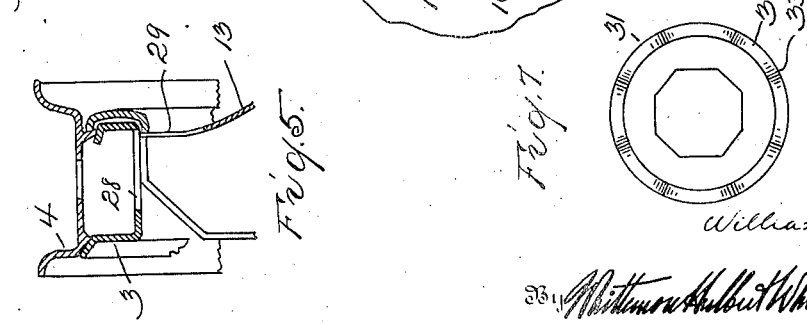
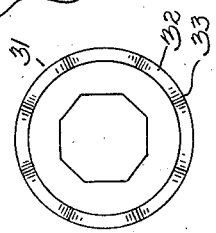
Inventor
William N. Booth
By Whittemore Hulbert Whittemore Belknap
Attorneys March 14, 1933. W. N. BOOTH 1,901,077
VEHICLE WHEEL
Filed April 7, 1924 4 Sheets-Sheet 2
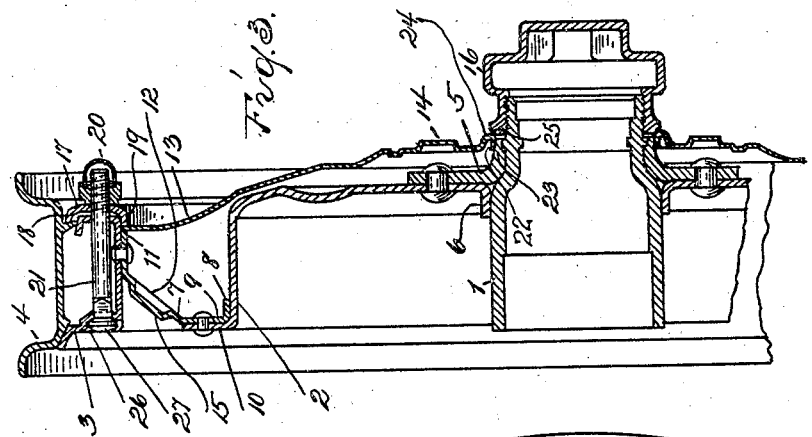
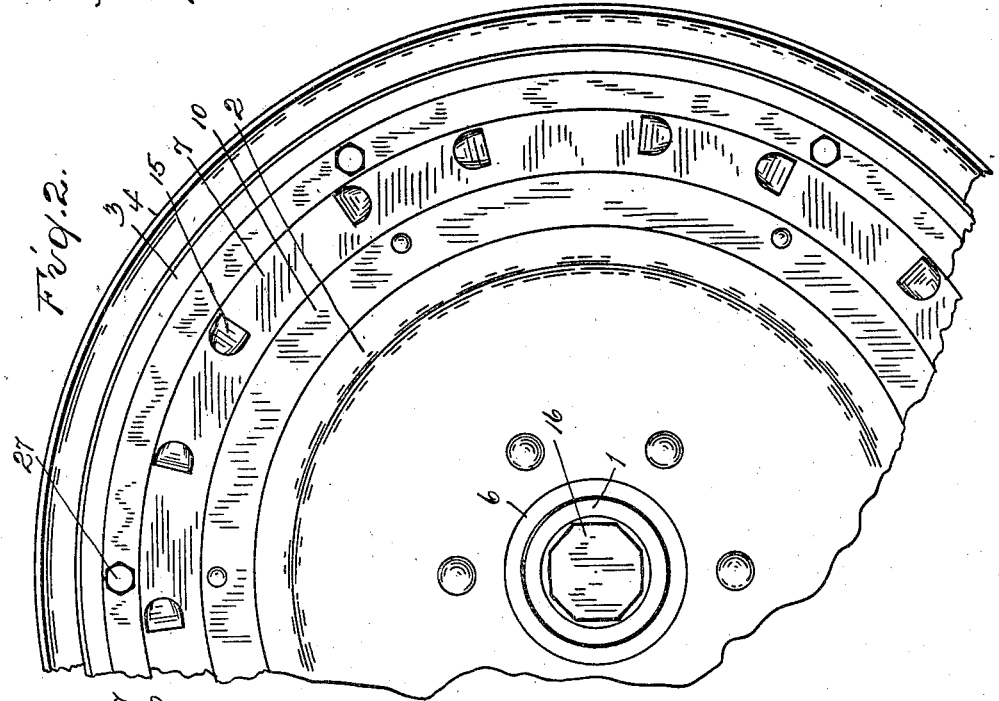
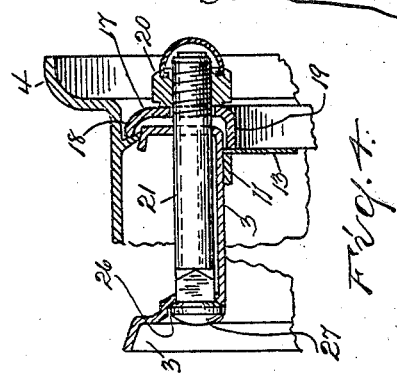
Inventor
William N. Booth

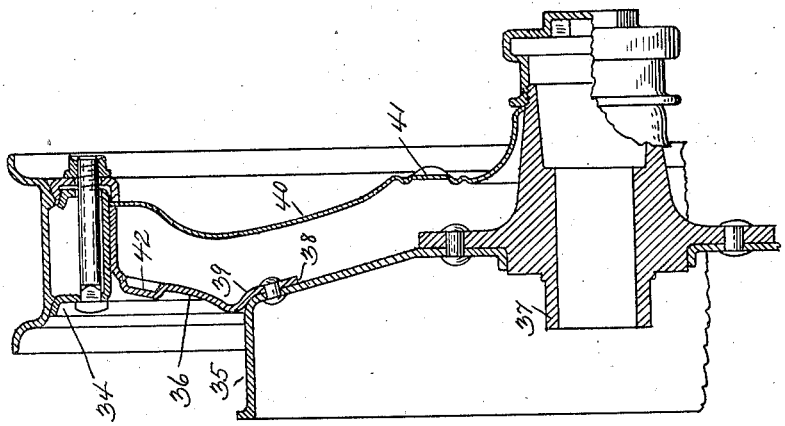
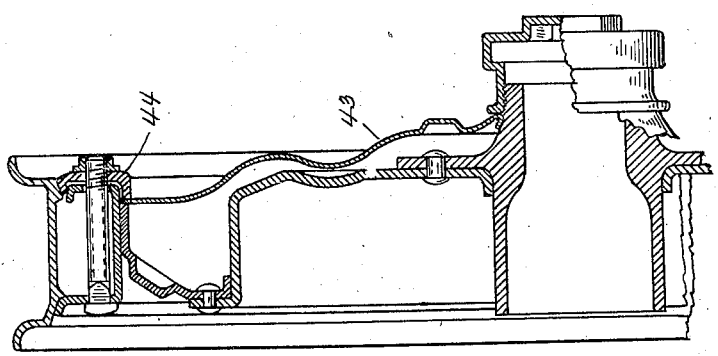
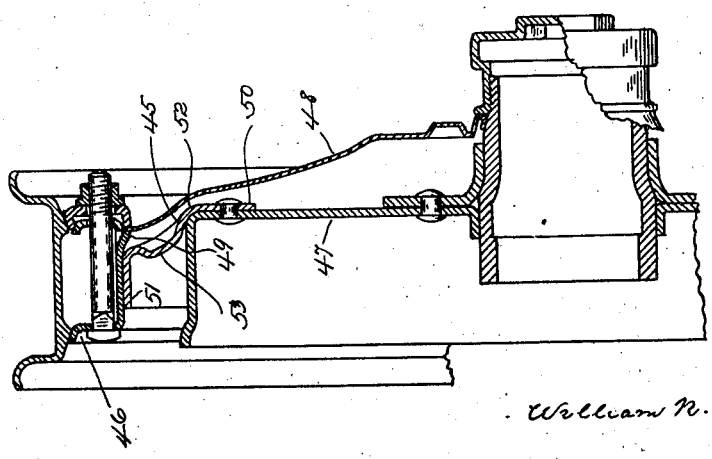

March 14, 1933.    W. N. BOOTH    1,901,077
VEHICLE WHEEL
Filed April 7, 1924    4 Sheets-Sheet 4
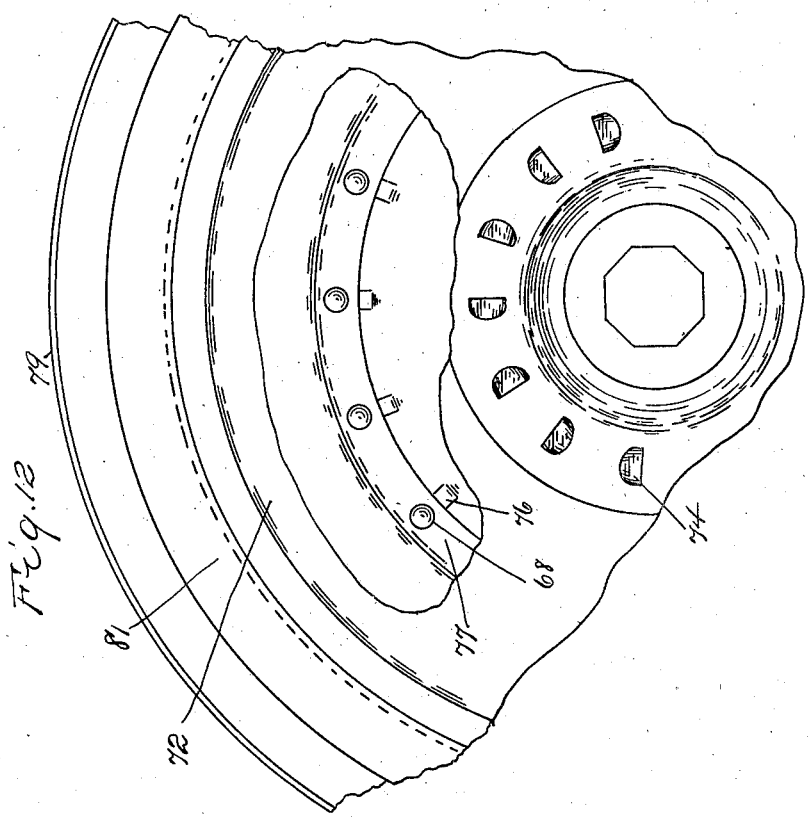
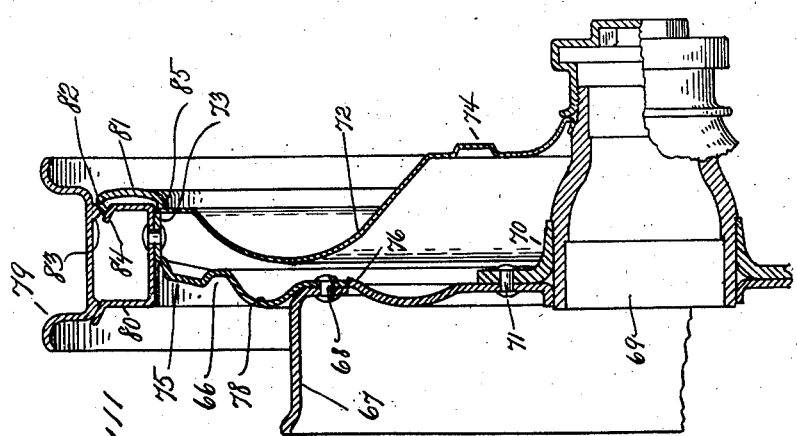
Inventor
William N. Booth
Attorneys Patented Mar. 14, 1933

1,901,077

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL

Application filed April 7, 1924. Serial No. 704,839.

The invention relates to vehicle wheels and has for some of its objects the decreasing of weight of the vehicle wheel and at the same time maintaining the necessary strength; and the reducing of the cost of manufacture of the vehicle wheel and also the forming of the same to present a finished and pleasing appearance. Another object is to cool the brake drum of the vehicle wheel. A further object is to provide means for normally retaining the hub cap from disengagement from the hub of the vehicle wheel.

With these as well as other objects in view, the invention resides in the novel features of construction and combinations and arrangements of parts as more fully hereinafter set forth.

In the drawings:

Figures 1 and 2 are respectively front and rear fragmentary side elevations of a vehicle wheel embodying my invention;

Figures 3, 4 and 5 are cross sections on the lines 3—3, 4—4, and 5—5 of Figure 1;

Figure 6 is a view similar to Figure 3 showing a modified construction of cover plate and hub cap;

Figure 7 is an end view of the hub cap shown in Figure 6;

Figures 8, 9 and 10, are views similar to Figure 3 but showing different modified constructions of vehicle wheels;

Figure 11 is a view similar to Figure 3 but showing a further modified construction;

Figure 12 is a side elevation of a portion of the vehicle wheel shown in Figure 13.

In the vehicle wheel shown in Figures 1 to 5 inclusive, 1 is the hub, 2 the brake drum, and 3 the felly upon which is seated the demountable rim 4 for carrying the tire. The hub is provided with the annular fixed flange 5 to which the brake drum is secured by suitable means such as rivets and the brake drum is preferably provided with the cylindrical flange 6 seated upon the hub.

The felly 3 is mounted upon the brake drum 2 and as a consequence the load is transmitted from the hub to the felly through the brake drum. As shown, 7 is the spacing ring between the felly and the brake drum and secured thereto. This spacing ring has at its inner edge the cylindrical flange 8 seated upon the periphery of the brake drum, the radial portion 9 in contact with the annular flange 10 upon the edge of the brake drum and secured thereto by suitable means such as rivets, the cylindrical flange 11 at its outer edge in contact with the inner periphery of the felly 3 and secured thereto by suitable means such as rivets, and the conical-shaped intermediate portion 12 connecting the flange 11 and the radial portion 9. This spacing ring secures the felly to the brake drum in substantially the plane of rotation of the latter.

For the purpose of concealing the brake drum 2 and spacing ring 7 so that the latter need not present a finished and ornamental appearance, thereby reducing the cost of manufacture, I have provided the cover plate 13 which extends between the felly 3 and the hub 1 and provides for a slight clearance between its outer periphery and the periphery of the felly so that the cover plate may be readily removed and furthermore will not carry the load. This cover plate is spaced in advance of the brake drum to provide an air space.

To secure a circulation of air through this air space and over the brake drum, the cover plate 13 is provided near its inner periphery or in its central portion with the annular series of louvres 14 and the spacing ring 7 is also provided in its intermediate portion 12 with the annular series of louvres 15. The louvres 14 open forwardly while the louvres 15 open rearwardly, and furthermore, alternate louvres of both series open in opposite directions so that irrespective of the direction of rotation of the vehicle wheel, a circulation of air through the space between the cover plate and the brake drum is assured, this air entering through the apertures produced in forming the louvres 14, passing the brake drum 2, and leaving through the apertures produced in forming the louvres 15. As a consequence, the brake drum is cooled.

Both the spacing ring and cover plate are preferably pressed from metal blanks, their louvres being stamped and having their free edges sheared from the metal forming the remaining portions of the spacing ring and cover plate.

The cover plate is secured to the vehicle wheel near its outer periphery by the means for securing the demountable rim 4 upon the felly 3 and at its inner periphery by means of the hub cap 16. In detail, 17 is a clamping ring of channel cross section and having the outer flange 18 engageable with the demountable rim to force and hold the latter to its seat upon the felly and also having the inner flange 19 which contacts with the cover plate 13 near its outer periphery and clamps the same against the edge of the cylindrical flange 11 of the spacing ring 7. This clamping ring is adapted to be moved inwardly toward the felly by means of the nuts 20 threaded upon the outer ends of the bolts 21 which extend through the side flanges of the felly. The cover plate has near its inner periphery the return-bent flange 22 which seats upon the tapering outer periphery of the cylindrical flange 23 of the fixed hub flange 5. In shaping the central portion of the cover plate, the bead 24 is formed having the bevelled face 25 which is engageable with a correspondingly bevelled face upon the hub cap 16, the arrangement being such that as the hub cap is screwed upon the hub to force the inner periphery of the cover plate upon the cylindrical flange of the fixed hub flange, the cooperating bevelled bearing surfaces upon the bead of the cover plate and hub cap engage, the former surrounding the latter and thereby holding the portion of the hub cap, which threadedly engages the hub, in engagement with the threads upon the hub and assisting in preventing the hub cap from radially expanding and splitting. Furthermore, the hub cap is more firmly held in frictional contact with the hub, thereby avoiding liability of the hub cap becoming accidentally disengaged.

For the purpose of providing clearance at the rear side of the felly 3 its rear side flange is inwardly offset at 26 to receive the heads 27 of the bolts 21 so that the ends of these heads are substantially flush with the rear face of the main portion of the rear side flange. The bolts 21 are non-rotatably secured to the rear side flange by forming the portions of the bolts adjacent their heads of polygonal section and engaging these portions in correspondingly-shaped apertures in the rear side flange. Also, these bolts are preferably secured from longitudinal displacement relative to the felly by shearing up the corners of the polygonal portions to form fins contacting with the front face of the rear side flange.

To provide for the valve stem of the pneumatic tire, I have, as shown particularly in Figure 5, formed in the base of the felly 3 the transverse elongated aperture 28 and have also formed in the adjacent cylindrical portion of the spacing ring 7, a registering elongated aperture as well as a radially-extending elongated aperture 29 in the cover plate 13 through which the valve stem extends so that access may be readily had to its free end.

In the modification shown in Figures 6 and 7, the contacting portions of the cover plate 30 and hub cap 31 are provided with spaced cam surfaces or alternate depressions and raises 32 and 33 respectively, whereby the hub cap is yieldably locked from rotation relative to the hub by means of the cover plate, the latter being sufficiently resilient for this purpose.

In the modification of vehicle wheel, as shown in Figure 8, the felly 34 is supported upon the brake drum 35 by the spacing ring 36 in an outwardly offset relation to the brake drum and the brake drum is secured to the hub 37 in an inwardly offset direction relative thereto. The spacing ring 36 has the inwardly extending flange 38 in contact with and secured to the outer side of the brake drum 35 and the inwardly curved portion 39 which surrounds and rests partially upon the periphery of the brake drum, the remaining portions of the spacing ring being in general the same as the corresponding portions of the spacing ring 7. The cover plate 40 is adapted to be secured to the vehicle wheel in the same manner as either the cover plates 13 or 30 and is provided with the louvres 41, which, with the louvres 42 in the spacing ring 36, create the circulation of air through the space between the brake drum and cover plate and over the brake drum for cooling the latter.

As shown in Figure 9, the modified construction of vehicle wheel is very similar to that shown in Figure 3 with the exception that the cover plate 43 has a different cross sectional contour and it is secured near its outer periphery by means of the clamps 44 instead of a clamping ring, The modified construction of vehicle wheel shown in Figure 10 is in general the same as that shown in Figure 8 with the exception that the spacing ring 45 is so shaped that the felly 46 is substantially in the plane of rotation of the brake drum 47 and also with the exception that the abutment for the rear side of the cover plate 48 near its outer periphery is formed by means of radially-inwardly struck lugs 49 upon the base of the felly. The spacing ring 45, as shown, has the inwardly extending flange 50 in contact with and secured to the outer face of the brake drum 47, the cylindrical flange 51 at its outer edge extending axially inwardly relative to the wheel and in contact with and secured to the base of the felly, and the curved portion 52 connecting the louvred portion 53 to the inwardly extending flange 50 and surrounding and in contact with the corner portion of the brake drum.

The vehicle wheel shown in Figures 11 and 12 is similar to that shown in Figure 8 in that the spacing ring 66 is connected to the outer side of the brake drum 67 by suitable means such as rivets 68 and the brake drum is mounted upon the hub 69 and connected to the fixed flange 70 at the inner side of the latter by suitable means such as the rivets 71. There is also the cover plate 72 mounted at its inner periphery upon the hub and adapted to abut near its outer periphery the edge of the cylindrical flange 73 at the outer edge of the spacing ring. The cover plate is spaced from the brake drum and main portion of the spacing ring and is provided with the oppositely-facing louvres 74 near its central portion, while the spacing ring is provided near its outer edge with the oppositely facing louvres 75 which cooperate with the louvres 74 to effect a circulation of air through the space and over the brake drum.

For the purpose of centering the spacing ring 66 upon the brake drum 67 the latter is preferably provided with the annular series of outwardly struck tongues 76 which form substantially square shoulders engageable with the inner periphery of the radial securing portion 77 of the spacing ring. By reason of these centering projections, the bead 78 connecting into the radial portions 77 need not be curved to engage the outer periphery of the brake drum.

Also, as shown in these two figures, the means for forcing the demountable rim 79 to its seat upon the felly 80 which is secured to the cylindrical flange 73 of the spacing ring includes a clamp 81 which has a wedge portion 82 engageable between the outer bead 83 upon the base of the demountable rim and the flared flange 84 at the outer edge of the outer leg of the felly. In detail, this clamp is a ring of substantially channel cross section and having an inner leg 85 engageable with the outer side of the cover plate 72 near its outer periphery and an outer leg terminating in the wedge portion 82. This ring is forced inwardly relative to the felly by suitable nuts threadedly engaging the outer ends of suitable bolts extending transversely to and secured to the felly.

What I claim as my invention is:

1. In a vehicle wheel, the combination with a brake drum, of a cover plate for said brake drum spaced therefrom, and means upon said cover plate for creating a flow of air through the space between said brake drum and cover plate.

2. In a vehicle wheel, the combination with the hub, a brake drum mounted thereon, and a wheel body element mounted upon said brake drum, of a cover plate for said wheel body element and brake drum spaced from the latter, and means upon said cover plate for creating a flow of air through the space between said brake drum and cover plate.

3. In a vehicle wheel, the combination with a brake drum and a ring mounted upon said brake drum, of a cover plate for said ring and brake drum and spaced from the latter, and louvres upon said cover plate for creating a flow of air through the space between said brake drum and cover plate.

4. In a vehicle wheel, the combination with a brake drum and a wheel body element mounted upon said brake drum and provided with an aperture, of a cover plate for said wheel body element and brake drum and spaced from the latter, and air deflecting means upon said cover plate for creating a flow of air through the space between said brake drum and cover plate and through the aperture in said wheel body element.

5. In a vehicle wheel, the combination with a brake drum and an annular wheel body element mounted upon said brake drum near its outer periphery, of a cover plate for said wheel body element and brake drum and spaced from said brake drum, said cover plate being provided with louvres for creating a current of air through the space.

6. In a vehicle wheel, the combination with a brake drum and a wheel body element, of a removable cover plate for the brake drum and wheel body element having means for creating a flow of cooling medium over substantially the entire area of the brake drum.

7. In a vehicle wheel, the combination with a hub, a brake drum mounted thereon and a wheel body element mounted upon the brake drum, of a cover plate for the wheel body element and brake drum spaced from the latter and having a hub receiving portion, and means upon the cover plate adjacent the hub receiving portion thereof for creating a circulation of air through the space between the brake drum and cover plate.

8. A vehicle wheel having a hub, a wheel body including a brake drum supported by the hub, a cover plate seated upon the hub in spaced relation to the wheel body and substantially concealing the latter, and means on said cover plate for creating a flow of air through the space between the brake drum and cover plate.

9. A vehicle wheel having a wheel body element, a brake drum, a cover plate for the wheel body element and brake drum, said cover plate being spaced from the brake drum and wheel body element and cooperating means upon the wheel body element and cover plate for creating a circulation of air through the space between the latter and brake drum.

10. A vehicle wheel having a brake drum, a ring extending outwardly from the periphery of the brake drum and having louvre openings therein adjacent the periphery thereof, a cover plate spaced laterally from the brake drum and ring and having louvre openings therein adjacent the axis of rotation of the wheel and cooperating with the louvre openings aforesaid to provide for a circulation of air over the brake drum.

11. A vehicle wheel having a hub, a brake drum, a cover plate for the brake drum having a portion seated upon the hub, and means on the cover plate adjacent the portion aforesaid for creating a flow of air over the brake drum.

12. A vehicle wheel having a hub, a brake drum supported by the hub, a ring extending outwardly from the brake drum, a cover plate spaced laterally from the ring and brake drum, said cover plate having a portion sleeved over the hub and having another portion abutting said ring and louvre openings in said first-mentioned portion of the cover plate for creating a circulation of air through the space between the drum and plate.

13. In a vehicle wheel, the combination with a hub, a brake drum mounted on the hub and a felly, of a wheel body element forming the sole means for securing the felly in a fixed position relative to the brake drum, a second wheel body element cooperating with the element aforesaid to form a space around the brake flange of the brake drum, and means providing for the circulation of air through said space.

In testimony whereof I affix my signature.

WILLIAM N. BOOTH.